United States Patent

Duddy et al.

[11] Patent Number: 5,906,953
[45] Date of Patent: May 25, 1999

[54] CATALYST REJUVENATION PROCESS

[75] Inventors: John E. Duddy, Bensalem, Pa.; Lawrence M. Abrams, Cherry Hill; Steven J. Hildebrandt, Kendall Park, both of N.J.

[73] Assignee: HRI, Princeton, N.J.

[21] Appl. No.: 08/853,394

[22] Filed: May 9, 1997

[51] Int. Cl.[6] .............................. B01J 38/60; B01J 38/52; B01J 20/34
[52] U.S. Cl. .................................. 502/27; 502/31; 502/33
[58] Field of Search .................................. 502/22, 27, 31, 502/33

[56] References Cited

U.S. PATENT DOCUMENTS

| | | | |
|---|---|---|---|
| 4,454,240 | 6/1984 | Ganguli | 502/26 |
| 4,863,884 | 9/1989 | Tasker et al. | 502/27 |
| 5,358,915 | 10/1994 | Nebergall et al. | 502/27 |

*Primary Examiner*—Michael Lewis
*Assistant Examiner*—Alexander G. Ghyka
*Attorney, Agent, or Firm*—Fred A. Wilson; John F. Ritter

[57] ABSTRACT

A process and apparatus for rejuvenating particulate used catalysts in a single rejuvenation vessel and providing a rejuvenated catalyst material having properties that result in activity substantially equal to new catalyst. The pressurizable vertically-oriented vessel has inlet and outlet openings for the catalyst and washing liquids, and is arranged to facilitate successive solvent liquid washing, water washings, and acid treatment steps for the used particulate catalyst provided in a bed in the vessel conical-shaped lower portion which contains catalyst rotary stirring means. After rejuvenation of the used catalyst, it is withdrawn from the vessel conical-shaped lower portion downwardly through a central withdrawal conduit and control valve for further processing. The water-soluble solvent and acid treatment liquids can be usually recovered by distillation for reuse in the catalyst rejuvenation process. The solvent-washed and acid-treated catalyst is separately heated and oxidized to remove carbon deposits and provide a completely rejuvenated catalyst material.

10 Claims, 3 Drawing Sheets

CATALYST REJUVENATION PROCESS

BACKGROUND OF THE INVENTION

This invention pertains to rejuvenation of particulate used catalysts removed from catalytic hydroprocessing of carbonaceous feedstocks. It pertains particularly to a catalyst rejuvenation process and apparatus utilizing only liquid/solid contact with a polar solvent and a dilute acid solution for substantial removal of contaminant metals and subsequent oxidation of essentially all carbon deposits from the used catalyst.

Various processes for rejuvenation of spent catalysts used in hydroprocessing of hydrocarbon feedstocks are known. For example, U.S. Pat. Nos. 4,454,240 and 4,595,666 to Ganguli each describe a procedure for spent catalyst regeneration by solvent washing and acid treatment steps, in which the spent catalyst is washed with naphtha or toluene solvent to remove retained heavy oil, heated to remove the retained solvent, water washed to fill the catalyst pores, then passed to an acid treatment vessel and contacted with a dilute acid solution. The acid-treated catalyst is washed with water to remove the retained acid, and then dried and oxidized at desired high temperature to burn off carbon deposits. However, for these catalyst regeneration processes, separate vessels are needed for washing the used catalyst with the solvent and for treating the catalyst with the acid, so that movement of the catalyst from the solvent washing vessel to the acid treating vessel results in appreciable attrition of the catalyst and undesired handling costs. Also, the catalyst washing vessel must be constructed to achieve efficient liquid/solid contacting for process oil removal, and for gas/solid contacting for solvent removal and drying of the catalyst. U.S. Pat. No. 4,720,473 to Welch et al discloses stripping used catalyst to remove oily residue, grading the catalyst for size, and then oxidizing it to remove coke deposits. Also, U.S. Pat. Nos. 4,769,219 and 4,863,884 to Tasker et al disclose a vessel assembly and method steps for rejuvenating used catalyst in a single vessel, utilizing successive solvent washing, vacuum drying, acid treatment and gas drying steps. Thus, although some catalyst rejuvenation procedures for used hydroprocessing catalysts are known, these procedures have various disadvantages and further cost effective improvements in catalyst rejuvenation processes for such used catalysts are needed in the industry.

SUMMARY OF THE INVENTION

This invention provides an improved catalyst rejuvenation process and apparatus for effective rejuvenation of used or spent particulate catalysts resulting from catalytic hydroprocessing of carbonaceous feedstreams, such as metals-containing petroleum residua or from hydrogenation and liquefaction of coal, so as to restore the catalyst characteristics and activity to substantially that of fresh catalyst. Such used catalysts contain three main contaminants, the first being heavy oil from the catalytic hydroprocessing operations, with the oil being retained on the catalyst surface and in the catalyst pores. The other two contaminants are metals deposits, primarily nickel and vanadium compounds which are removed from metals-containing feedstocks, and coke deposited on the used catalyst during such hydroprocessing operations. This invention provides improved catalyst rejuvenation process steps and apparatus suitable for effective removal of the residual oils, contaminant metals and carbon deposits from the used catalyst removed from either ebullated bed or fixed bed hydroprocessing reactors, so as to substantially restore its catalytic activity to that of fresh catalyst.

The catalyst rejuvenation process according to this invention utilizes solvent washing and acid treatment steps adapted for processing relatively large amounts of particulate used catalysts at significantly lower severity and longer time durations than previously used. This catalyst rejuvenation process is particularly useful for larger commercial size operations involving 5,000–20,000 pound (2,270–9,090 kg) batches of the used catalyst, and for which substantially all contacting occurs between the used catalyst particulate solids and solvent and acid liquids, but without requiring any gas heating and drying steps for the used catalyst. This invention provides for all the catalyst solvent washing and acid treatment steps to be performed at relatively low temperatures of 90–150° F. and for desirably longer time durations of 30–150 minutes in a single catalyst rejuvenation vessel provided with suitable mechanical mixing means, and which is adapted for providing gentle but effective catalyst/liquid contacting with minimal attrition of the catalyst particles. Such lower treatment temperatures for longer time durations have been found to be more effective for selective contaminant metals removal from particulate used catalysts, particularly for large scale catalyst rejuvenation operations. Utilizing such a single rejuvenation vessel for the successive solvent washing and acid treatment steps also advantageously eliminates catalyst attrition problems associated with the usual successive transfers of batches of the used catalyst particles from one treatment vessel to another. The catalyst washing and treatment time durations used are significantly longer than the time required to fill the treatment vessel with the liquid reagents and to drain the liquids at the end of each wash or acid treatment cycle.

According to the invention, this catalyst rejuvenation process includes first removing process oils from the used particulate catalyst by washing it with a polar organic solvent which is both oil soluble and water soluble, such as acetone or other similar organic solvent liquid, followed by water washing the substantially oil-free catalyst to remove the solvent without requiring any gas drying step. Further process steps include acid treating the oil-free catalyst with a suitable dilute acid solution such as 5–30% sulfuric acid, for substantially removing contaminant metals such as nickel and vanadium compounds from the used catalyst with only minimal removal of the catalyst active metals and base material, then again water washing the acid-treated catalyst to remove the residual acid solution. Other examples of useful treating acids include, but is not limited to, acetic, hydrochloric and nitric acids. The acid treatment solution, temperature and time duration are all selected so that the catalyst active metal removal does not exceed about 4 wt. % and the base material removal does not exceed about 6 wt. % of the fresh catalyst. Because the polar solvent and acid liquids used for the washing and treatment steps are soluble in both oil and water, this catalyst rejuvenation process can advantageously utilize an efficient two-step water washing procedure for the solvent washed and the acid treated catalyst, after which the solvent and the acid liquids may be recovered by distillation for reuse in the rejuvenation process.

After contaminant metals removal and liquid drainings, the acid-treated and water washed catalyst is next preferably heated and oxidized during contact with an oxygen-containing gas such as inert gas/air or steam/air mixture at appropriate high temperature and time duration conditions in a separate suitable vessel to burn off and remove substantially all coke deposits from the catalyst. These catalyst rejuvenation steps, specifically adapted for substantially removing the three main contaminants, restore the used particulate catalyst so as to have physical characteristics that result in catalytic activity substantially equal to that of fresh catalyst. This invention also includes a vertically-oriented catalyst rejuvenation vessel assembly in which the used catalyst solvent washing and acid treatment steps are performed.

This invention advantageously provides a used catalyst rejuvenation process and a vertically-oriented catalyst rejuvenation vessel assembly in which all liquid contacting occurs between the particulate used catalyst and water-soluble solvent and acid liquids in the single special treatment vessel. The vessel is equipped with mechanical stirring means adapted for providing effective catalyst to liquid contact, so that the catalyst treatment temperatures are minimized and expensive gas drying and evacuation steps are avoided. The water washing of the used solvent-washed catalyst and the acid-treated catalyst are each preferably performed in two successive steps, and the polar solvent liquid such as acetone and the treatment acid liquid such as sulfuric acid solution may both be recovered by distillation steps for reuse in the process.

BRIEF DESCRIPTION OF THE DRAWINGS

The invention will be described further by reference to the following drawings, in which.

DESCRIPTION OF INVENTION

Figure 1:
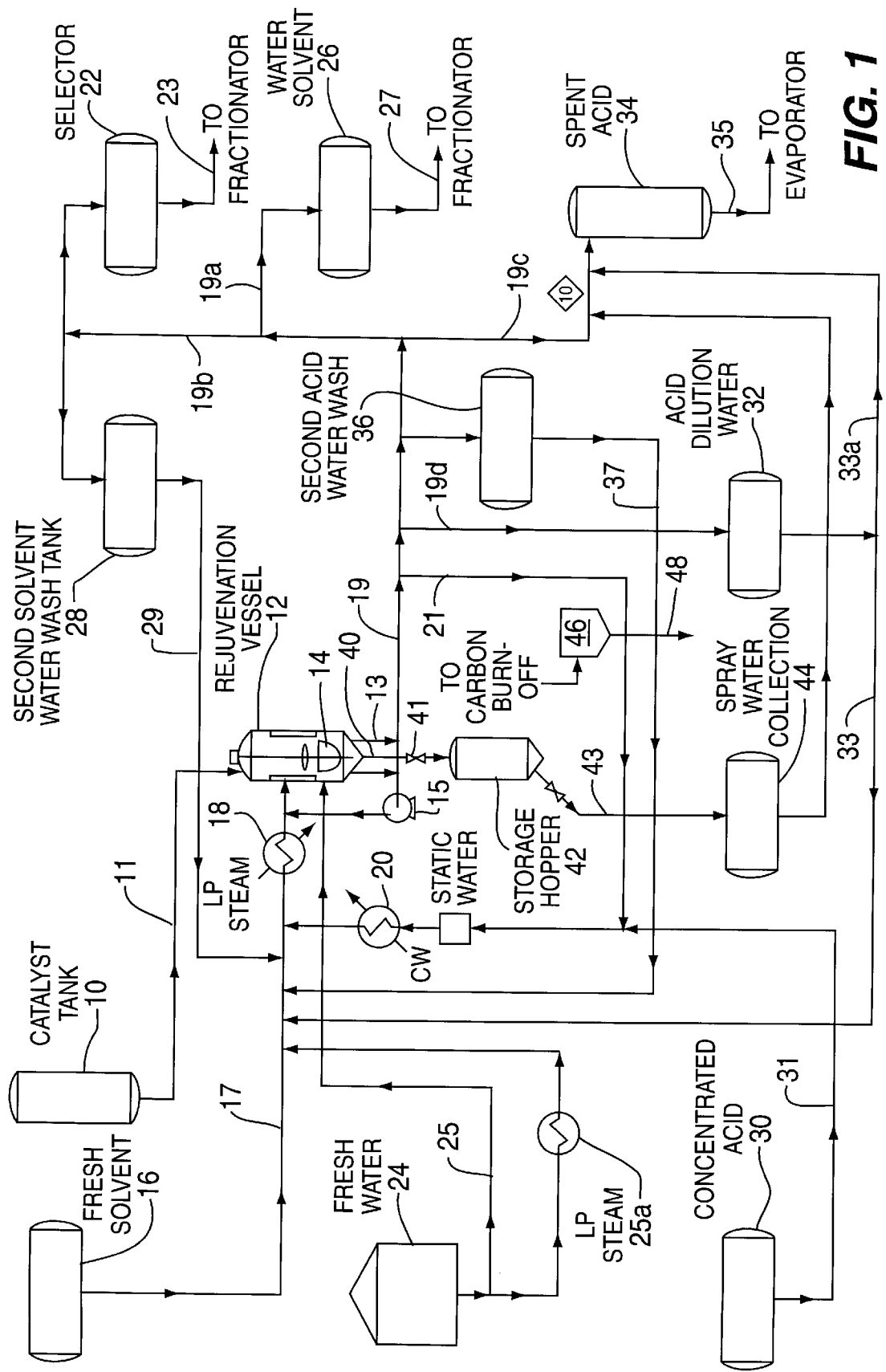
FIG. 1 is a schematic flow diagram for this improved catalyst rejuvenation process for used hydroprocessing catalysts, including specific solvent wash steps and acid treatment steps, followed by a carbon burn-off step.

The used catalyst rejuvenation process according to this invention as shown schematically in FIG. 1 is a batch type process providing three basic steps specifically adapted to remove each of the three main contaminants from the used catalyst, i.e. the heavy process oil, contaminant metals deposits, and coke deposits, and thereby substantially restore the catalyst activity. In the process first basic step, a large batch of the used particulate catalyst such as 5,000–20,000 pounds which is coated with heavy process oil from a prior catalytic hydroprocessing step, is withdrawn through conduit 9 from a high temperature reactor (not shown), and is usually initially placed in a catalyst holding tank 10. From tank 10, a desired size batch of the used oil-coated catalyst is transferred through conduit 11 into rejuvenation vessel 12. Alternatively, the used catalyst in tank 10 may be transferred to the rejuvenation vessel 12 by suitable separate transportable containers.

In vessel 12, the heavy process oil coating is removed by washing the catalyst with a suitable polar organic solvent liquid which is soluble in both oil and water. The rejuvenation vessel 12 is provided with catalyst agitation or rotary stirring means 14, which are shown in greater detail by FIGS. 2 and 3, to facilitate gentle but effective catalyst/solvent liquid contact. Suitable fresh polar solvent liquid is provided to vessel 12 from a source 16 through conduit 17. Such solvents include but are not limited to acetone, acetaldehyde, acetonitrile, aniline, 2-methoxy ethanol; ethylene glycol dimethyl ether, di (ethylene glycol) methyl ether, dioxane and methyl tertiary butylether, with acetone usually being preferred because of its ready availability, low cost, and its easy recovery. If desired, additional contact of the used catalyst with solvent liquid in the rejuvenation vessel 12 can be provided by withdrawing liquid through a lower conduit(s) 13 and recycling it through pump 15 back to the conduit 17, or alternatively by reversing the solvent flow by withdrawing liquid through conduit 17 to pump 15 and back to vessel 12 through the lower conduit(s) 13.

In the rejuvenation vessel 12, the desired solvent washing conditions provided for the oil-coated used catalyst are solvent:catalyst weight ratio in the range of 1.5:1 to 3:1 at 90–150° F. temperature and essentially atmospheric pressure for 60–120 minutes duration. The solvent liquid washing temperature in vessel 12 is maintained in part by steam provided to heat exchanger 18 located in the solvent supply conduit 17. The catalyst is preferably washed twice with the liquid solvent at 100–130° F. for 60–120 minutes per wash at a weight ratio of 2 pounds acetone to 1 pound of used catalyst plus its retained process oil. During both catalyst wash steps with the solvent liquid, gentle agitation or stirring is provided to the catalyst batch by the rotary stirrer means 14 at low rotary speed of 1–20 rpm, so that the stirrer blade tip speed does not exceed about 2.6 ft/sec so as to avoid undesired catalyst particle attrition. During such solvent washing, the solvent liquid is circulated from the rejuvenation vessel 12 through conduits 19 and 21 and heat exchanger 20 to make up heat losses, and then back through conduit 17 into the vessel 12. The resulting solvent washed catalyst retains a maximum of only about 2 wt. % process oil. The solvent/oil mixture from each solvent wash step is withdrawn through conduit 19 and 19a and passed to a holding tank 22, from which it may be continuously withdrawn through conduit 23 to a fractionator unit (not shown) to recover the solvent liquid for reuse in the catalyst rejuvenation process.

The resulting solvent-washed particulate catalyst retained in rejuvenation vessel 12 is next water washed with water supplied from tank 24 through conduit 25 at selected temperature range of 100–130° F. and with gentle agitation of the catalyst provided by the rotary stirrer means 14, so as to remove substantially all the solvent from the catalyst. Such water washing of the catalyst avoids a catalyst heating and drying step usually provided for solvent removal by evaporation. The water wash also removes a small amount of contaminant metals deposits from the catalyst, along with the retained solvent. The water/solvent liquid from the water wash is passed through conduit 19 and 19a to a first holding tank 26, the contents of which may be continuously passed through conduit 27 to a fractionator unit (not shown) for recovery of the solvent for reuse. Because this water wash stream is slightly acidic, corrosion resistant construction is used for the holding tank 26, fractionator unit and associated equipment. Such contacting of the oil-free catalyst with water effectively removes the polar organic solvent liquid from the used catalyst, and also substantially fills the catalyst pores with the water, thereby buffering any subsequent acid attack on the catalyst active metals provided on the catalyst surface, so as to minimize or avoid undesired removal of the active metals from the catalyst.

The solvent-washed catalyst in rejuvenation vessel 12 is preferably washed twice with water at 100–125° F. at a weight ratio of water:catalyst of about 2.5 to 1 to remove essentially all of the solvent from the catalyst particle surface and pores. For such two-step water washing of the catalyst to remove solvent, the water/solvent liquid from the first water wash step is passed to the holding tank 26 as described above. However, the catalyst second water wash step uses fresh water from tank 24 and conduit 25 to remove substantially all remaining solvent from the catalyst, and the water/solvent is passed through conduits 19 and 19b to a second holding tank 28 for later use as the first water wash returned through conduit 29 for the solvent washed catalyst, so as to minimize water usage and waste water streams.

In the second basic catalyst rejuvenation step, the metal contaminant deposits are removed from the substantially oil-free particulate catalyst by contacting the catalyst with a dilute acid solution such as 5–30 wt. % acid solution and preferably 10–20 wt. % sulfuric acid solution provided from acid source 30, after the prior washing of the catalyst with water to remove the solvent. Useful acid treatment conditions for effective contaminant metals removal are acid:catalyst weight ratio of 2:1 to 3:1 and at temperature of 100–175° F. and 0–10 psig pressure for 50–150 minutes duration. The oil-free catalyst is preferably contacted with an acid:catalyst weight ratio of about 2.5 to 1 dilute sulfuric acid-water solution in the range of 10 to 15 weight percent $H_2SO_4$ at 120–130° F. and 60–120 minutes duration. For the acid treatment step, acid dilution water available from holding tank source 32 is first introduced through conduit 33 into the rejuvenation vessel 12, and agitation and circulation of the water is started from the bottom of the vessel through the conduit 19 and heat exchanger 20 into the upper portion of the vessel. Next, concentrated acid from the acid source 30 is added gradually through conduit 31 to the liquid circulation conduit 21 during about 15 minutes, while the rejuvenation vessel 12 liquid contents are circulated through the heat exchanger 20 to counteract the heat of mixing and maintain the catalyst temperature at 120–130° F.

After the desired quantity of acid has been added from the source 30 to rejuvenation vessel 12 to provide the desired 10–20% acid concentration therein for the catalyst treatment step, circulation through the wash heat exchanger 20 and heat exchanger 18 is continued to either heat or cool the liquid as required to maintain the temperature at 120–130° F., and gentle catalyst agitation by stirring means 14 is continued for the desired treatment time of about 90 minutes. About 30–40 wt. % of the contaminant metals are removed from the used catalyst. The acid solution also attacks the catalyst active metals and base support material as well as the contaminant metals but at a much lower rate, so that a maximum of only about 4.0 wt. % of the active metal such as cobalt, molybdenum or nickel and 6 wt. % of the base material such as alumina are removed from the used catalyst particles. Preferably, only 0–3 wt. % of the active metals and 0–5 wt. % of the base material are removed from the catalyst by the acid treatment step. It is found that the residual coke remaining on the used catalyst particles protects the active metals from attack by the acid treatment while the contaminant metals being removed are located primarily on the outer surfaces of the catalyst.

At the conclusion of the acid treating period for the catalyst, spent acid solution together with any unreacted acid is drained from vessel 12 through conduits 19 and 19c to spent acid tank 34, from which it may be passed through conduit 35 on to a waste acid concentrating step (not shown) for recovery and reuse.

The catalyst acid treatment step is followed by at least one and preferably by two water washes to effectively remove the acid from the catalyst particle surface and pores. For the single water washing step, fresh water from tank 24 is heated as needed at 25a and passed to rejuvenation vessel 12, and after catalyst washing the resulting water and spent acid is removed through conduits 19 and 19c to the spent acid tank 34. The preferred two water wash steps are sequenced so as to minimize water usage and waste streams. The first step acid-water wash liquid is available from holding tank 36, as described below, and is returned by conduit 37 back to rejuvenation vessel 12. The catalyst is water washed for approximately one hour at about 125° F. The wash water is then drained through conduit 19 to the holding tank 32 and then used to dilute the concentrated acid from source 30 for the acid treatment for the next batch of catalyst. Excess water not needed to dilute the acid is disposed through conduit 33a to the spent acid tank 34. The second water wash uses fresh water from holding tank 24 and conduit 25 to remove the last traces of acid from the catalyst. The water from the second wash step is stored in the holding tank 36, and is recycled through conduit 37 and reused as the first water wash for the next batch of used acid-treated catalyst in rejuvenation vessel 12. The total contaminant metals removal from the used catalyst by the acid treatment and the water wash streams is about 30–40 wt. % removal of vanadium, 30–40 wt. % removal of total nickel (contaminant plus active nickel), along with only about 4.0 maximum wt. % removal of active molybdenum and about 6 wt. % maximum removal of alumina support material. This level of contaminant metals removal from used catalysts has been shown to be sufficient for restoring the catalytic activity of the catalyst to substantially that of fresh catalyst.

The water washed catalyst is then drained by gravity flow from the rejuvenation vessel 12 through a central conduit 40 and shut-off valve 41 into a temporary storage hopper 42. Excess wash water is drained from the hopper 42 through conduit 43 to collection tank 44, from which it is disposed through conduit 45. Water from the collection tank 44 is intermittently used as spray water to wash down catalyst clinging to the lower conical section of vessel 12 when catalyst is being dumped to storage hopper 42.

For the third basic catalyst rejuvenation step, the acid treated catalyst is conveyed from the storage hopper 42 to a suitable oxidation vessel 46. In the oxidation vessel 46, controlled catalyst heating, drying and carbon burn-off is provided by passing gas having 1–20 vol. % oxygen concentration at preferably 750–850° F. temperature to burn-off and remove essentially all carbon deposits from the catalyst. Suitable carbon burnoff methods are disclosed by U.S. Pat. Nos. 4,454,220 and 4,621,069 to Ganguli, which are incorporated herein by reference to the extent needed to adequately disclose this invention. The final rejuvenated particulate catalyst product is removed at 48 for reuse in catalytic hydroprocessing of carbonaceous feedstocks, and has catalytic activity which is substantially equal to that of fresh catalyst.

Figure 2:
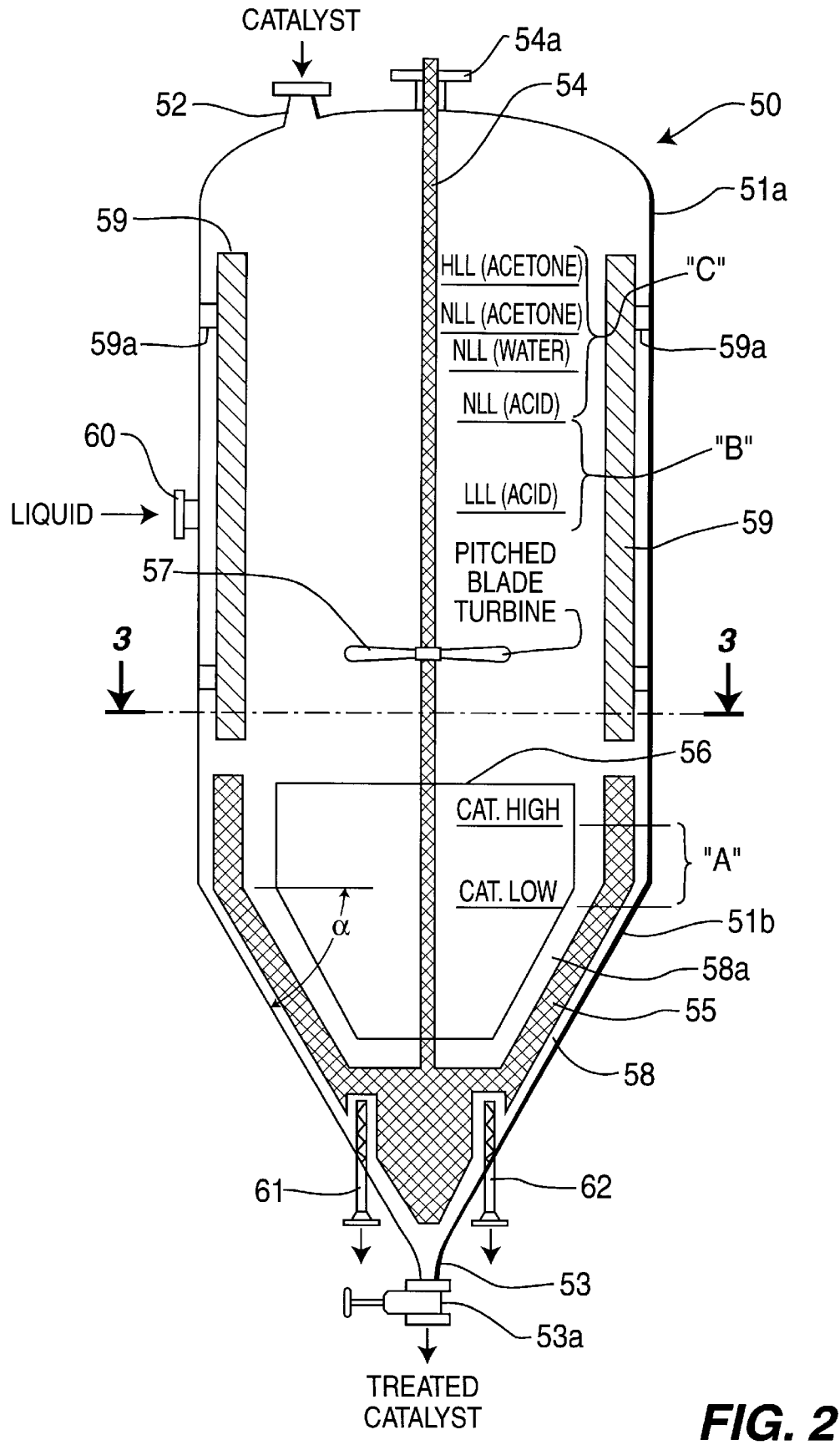
FIG. 2 shows an elevation sectional view of the catalyst rejuvenation vessel assembly used in the process of this invention.
Figure 3:
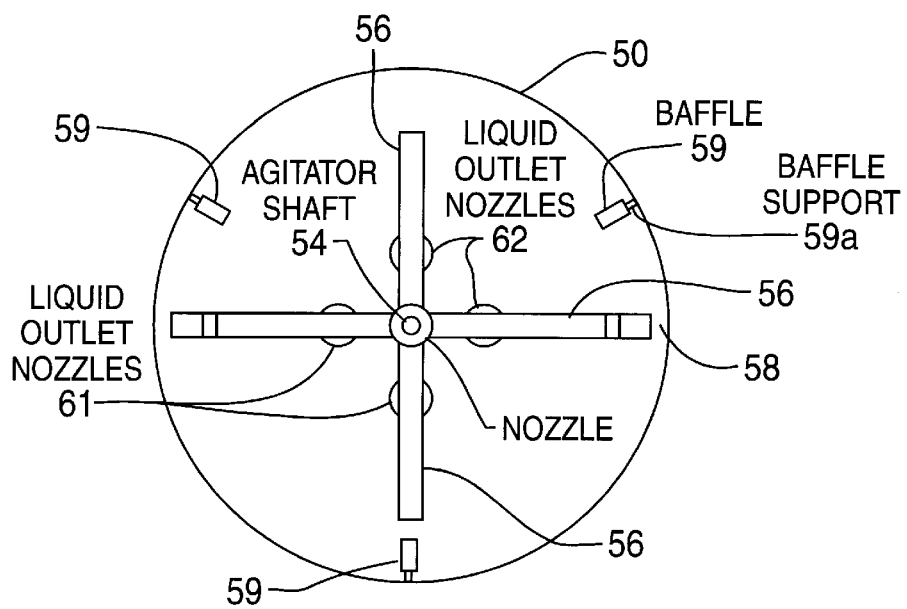
FIG. 3 shows a plan sectional view of the catalyst rejuvenation vessel taken at line 3—3 of FIG. 2.

The catalyst rejuvenation vessel assembly is shown is greater detail by FIGS. 2 and 3. As shown by FIG. 2, the pressurizable rejuvenation vessel 50 is generally cylindrical-shaped and vertically oriented, and includes a cylindrical upper portion 51a and conical-shaped lower portion 51b. The wall of lower portion 51b has an angle α of 45–70° with the horizontal plane, and preferably about 60° angle to facilitate particulate catalyst withdrawal by gravity flow from the vessel. An upper inlet nozzle 52 is provided for introducing batches of used particulate catalyst into the vessel 50, and central lower conduit 53 is provided for withdrawal of rejuvenated catalyst from the vessel conical-shaped lower end portion 51b. A suitable shut-off valve 53a such as a slide gate valve is connected to the conduit 53 for controlling withdrawal of the rejuvenated catalyst.

The rejuvenation vessel 50 is provided with a central vertical rotary shaft 54 driven by an electric motor/gear unit (not shown) located above the vessel, and includes a bearing seal means 54a which also supports multiple outer conical-shaped rotary stirrer blades 55 provided in the vessel lower conical portion. Also, an inner paddle 56 is supported by rotary shaft 54 and rotates with the outer stirrer blades 55. The rotary stirrer 55 includes 3–5 equi-spaced blades which are each spaced inwardly from the vessel wall by a gap 58 of about 1–2 inches, while a similar radial gap 58a is provided between the stirrer blades 55 and the outer edge of the inner paddle 56. Also, 2–4 equi-spaced stationary vertical baffles 59 are provided fixedly attached at 59a to the inner wall of the vessel cylindrical portion 51a above the stirrer blades 55 and paddle 56. Also, an intermediate rotary stirrer blade 57 can be attached to the rotary shaft 54 and located in the cylindrical portion 51a of the vessel for stirring the wash liquid(s) to ensure a uniform composition. Radial orientation of the rotary stirrer blades 55, the inner paddle 56 and the stationary baffles 59 are further shown in FIG. 3.

During used catalyst rejuvenation operations, a batch of used particulate catalyst is transferred into the rejuvenation vessel 50 lower portion through the upper nozzle opening 52. Wash liquids such as solvent and/or water are introduced successively into the rejuvenation vessel 50 through an intermediate side nozzle 60, and liquids are withdrawn from the vessel lower end through multiple outlet nozzles 61 and 62. As shown by FIG. 2, the used catalyst is confined to the lower conical-shaped portion 51b within a level range "A", which is below the upper end of the stirrer blades 55 and paddle 56. Acid solution is normally filled to level range "B" above the intermediate rotary blade 57. For the liquid solvent and water washes of the used catalyst, the rejuvenation vessel 50 is normally filled further to level range "C". The catalyst mixing and contact with the liquids is provided by the lower rotary stirrer blades 55 and paddle 56. Also, acid solution and wash water mixing is provided by the upper rotary stirrer blade 57 which mixes the liquid above the catalyst bed so as to maintain a uniform composition of the liquid.

Following the acid treatment step and the final catalyst water wash step, the particulate catalyst batch is withdrawn through central lower nozzle 53 and shut-off valve 53a, and is passed on to a carbon burn-off facility 46, as shown schematically in FIG. 1 to provide a completely rejuvenated catalyst.

This invention will be further described with the aid of the following examples, which should not be construed as limiting in scope.

EXAMPLE 1

Experiments were performed to compare oil removal effectiveness for water-soluble acetone solvent and water-insoluble toluene solvent from used particulate catalyst samples using a laboratory soxhlet extraction apparatus. This apparatus provided a constant reflux of each solvent liquid over a used catalyst sample at the solvent boiling temperature for 12–18 hours. The catalyst sample was then oven dried and the catalyst weight loss measured. The catalyst weight loss as determined by the soxhlet extraction with each solvent is by definition the amount of process oil removed from the used catalyst, and results are shown in Table 1.

TABLE 1

Oil Removal Effectiveness from Used Catalyst for Acetone versus Toluene Solvents

| Solvent Used | Boiling Temp., °F. | Catalyst Weight Loss, wt. % |
|---|---|---|
| Acetone | 133.7 | 18.8 |
| Toluene | 231.4 | 19.5 |

It is seen that the amount of weight loss obtained via soxhlet extraction with the acetone solvent liquid at lower temperature is more than 95% of that achieved with the toluene solvent liquid, and the retained process oil remaining on the used catalyst was reduced to less than about 1 wt. %. Thus, the effectiveness of the water-soluble acetone solvent for process oil removal from used catalyst is substantially equivalent to that for the toluene solvent.

EXAMPLE 2

Catalyst rejuvenation experiments for used particulate catalyst were performed using both the known prior art process of Ganguli compared to the present improved catalyst rejuvenation process. The processing steps and conditions used are listed in Table 2 below:

TABLE 2

Process Comparative Steps for Used Catalyst Rejuvenation

| Process Conditions | Prior Process | Present Process |
|---|---|---|
| Oil Removal Step | | |
| Solvent Used | Toluene | Acetone |
| Solvent: Catalyst Ratio (wt:wt) | 2:1 | 2:1 |
| Contact Time, Minutes | 60 | 100 |
| Temperature, °F. | 200 | 125 |
| Number of Wash Cycles | 2 | 2 |
| Solvent Removal/Water Wash | | |
| Gas Drying Temperature, $^N$F | 220 | None |
| Water: Catalyst Ratio (wt:wt) | 1:1 | 2.5:1 |
| Contact Time, Minutes | — | 60 |
| Temperature, °F. | 175 | 125 |
| Number of Wash Cycles | — | 2 |
| Acid Treatment Step | | |
| Acid Used | $H_2SO_4$ | $H_2SO_4$ |
| Acid Concentration, wt % | 15 | 12 |
| Acid: Catalyst Ratio (wt:wt) | 5:1 | 2.5:1 |
| Contact Time, Minutes | 30 | 120 |
| Temperature, °F. | 175 | 125 |
| Number of Cycles | 1 | 1 |
| Water Wash of Acid Treated Catalyst | | |
| Water: Catalyst Ratio (wt:wt) | 4:1 | 2.5:1 |
| Contact Time, Minutes | 30 | 30 |
| Temperature, °F. | 70 | 125 |
| Number of Cycles | 2 | 2 |
| Metals Removal From Used Catalyst, wt % | | |
| Aluminum | 4.5 | 5.5 |
| Molybdenum | 1.2 | 2.8 |
| Nickel | 22.9 | 36.9 |
| Vanadium | 24.5 | 37.4 |
| Selectivity Ratio for Vanadium Removal Relative to Aluminum Removal | 5.4 | 6.8 |

From the above results, it is seen that the improved process of this invention using water-soluble acetone solvent at lower temperature of only about 125° F. and increased contact time but without any gas drying step, instead of toluene solvent washing and a gas drying step, can achieve substantially the same or higher levels of process performance and improved selectivity for contaminant metals removal by conducting all the catalyst solvent washing and acid treatment steps in the liquid phase in a single catalyst rejuvenation vessel.

EXAMPLE 3

To evaluate the catalytic activity of the rejuvenated used catalyst as compared to fresh catalyst, two 15-day activity tests were performed in a typical two-stage continuous stirred tank reactor system using the rejuvenated catalyst prepared by the present process and fresh catalyst. The catalyst used was Criterion HDS-2443B, which is a nickel molybdenum/alumina extrudate catalyst having good hydrodesulfurization activity. The catalyst activity tests were performed on a typical petroleum Maya Isthmus vacuum residua feedstock having inspections as follows:

| Maya Isthmus Vacuum Resid Feedstock Inspections | |
|---|---|
| Gravity, API° | 4.5 |
| Carbon, wt. % | 84.2 |
| Hydrogen, wt. % | 10.0 |
| Sulfur, wt. % | 4.2 |
| Nitrogen, wt. % | 0.7 |
| Conradson Carbon Residue, wt. % | 27.8 |
| Vanadium, wppm | 475 |
| Nickel, wppm | 91 |
| Pentane Insolubles, wt. % | 25.3 |
| Yields, wt. % | |
| IBP-1,000° F. | 11.3 |
| 1,000° F.+ | 88.7 |

The catalyst activity tests compared the fresh and rejuvenated catalyst under two-stage reaction conditions as follows:

| Activity Test No. | 1 | 2 |
|---|---|---|
| Activity Test Catalyst Charge | | |
| First Stage Reactor | | |
| Fresh | 100% | 10% |
| Rejuvenated | 0% | 90% |
| Total | 100% | 100% |
| Second Stage Reactor | | |
| Fresh | 100% | 100 |
| Rejuvenated | 0% | 0% |
| Total | 100% | 100% |
| Activity Test Conditions | | |
| Test Duration, Days | 1–5 | 6–15 |
| Catalyst/Reactor Volume, cc | 128 | 128 |
| Oil Feed Rate, g/hr | 155 | 155 |
| Reaction Temperature, ° F. | 760 | 780 |
| Inlet $H_2$ Pressure, psia | 2300 | 2300 |

Inspections made on the fresh and used catalyst in its various conditions revealed the relative properties as shown in Table 3 below.

TABLE 3

| Relative Characteristics of Catalysts, % | | | |
|---|---|---|---|
| Catalyst Condition | Fresh | Used | Rejuvenated |
| Coke | 0 | 100 | 4 |
| Sulfur | 0 | 100 | <1 |
| Nickel | 0 | 100 | 10 |
| Vanadium | 0 | 100 | 72 |
| Surface Area | 100 | 82 | 92 |
| Pore Volume | 100 | 61 | 100 |
| Average Pore Diameter | 100 | 88 | 101 |
| Density | 100 | 137 | 109 |

For simplicity, the catalyst properties shown in Table 3 were normalized to a fresh catalyst basis, based on the measured levels of molybdenum metal on the catalyst. The values are also referenced to a specific base, with the fresh catalyst being the base for physical properties (surface area, pore volume, average pore diameter and density) and the used catalyst being the base for contaminants (coke, sulfur, nickel and vanadium). The used catalyst was obtained from a second stage ebullated bed reactor used in continuous bench scale hydrodesulfurization operations on the same petroleum feedstock (Maya Isthmus vacuum resid) at similar operating conditions, and having the catalyst age of 1.4 barrels of oil processed per pound of catalyst in the test reactor.

Figure 4:
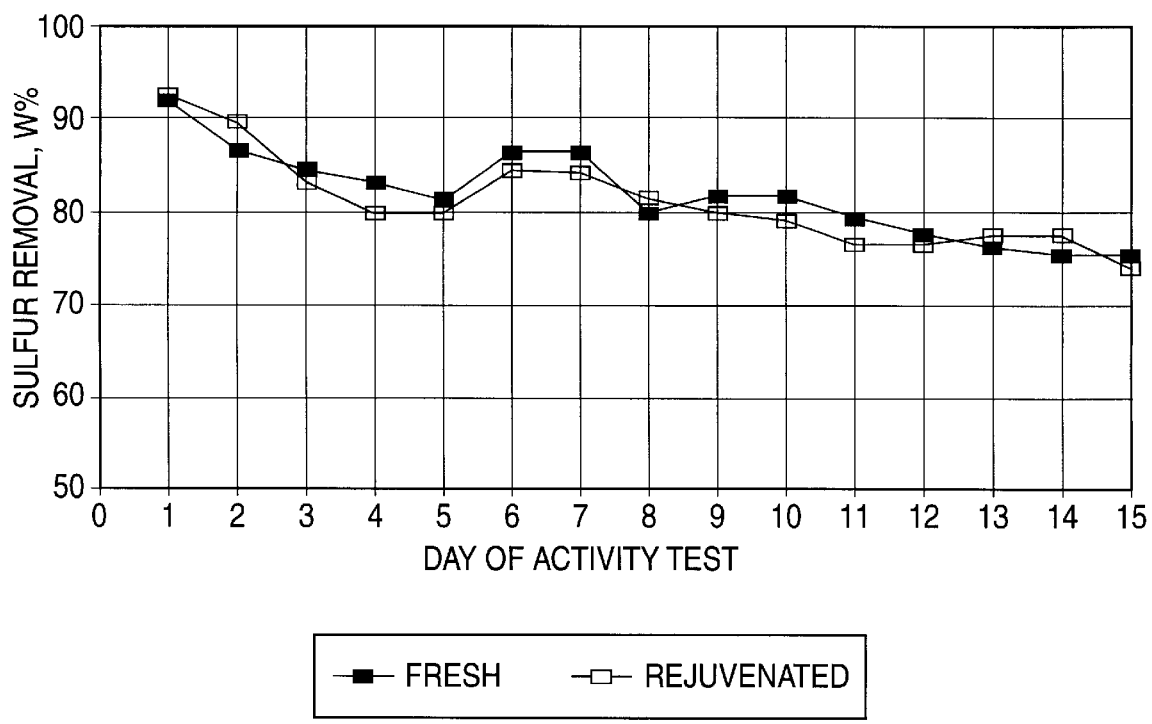
FIG. 4 is a graph showing comparative hydrodesulfurization results for a typical petroleum feedstock using both fresh catalyst and used catalyst rejuvenated according to this invention.

Comparative hydrodesulfurization activities for the fresh and rejuvenated catalyst during a 15-day test run is shown in FIG. 4. It is seen that processing of the used catalyst according to the present catalyst rejuvenation process restored the sulfur removal activity of the rejuvenated catalyst to levels very near that of the fresh catalyst.

Although the invention has been described broadly and in terms of specific embodiments thereof, it will be understood that modifications and variations can be made to the vessel, the stirrer configuration, and the method steps for catalyst rejuvenation within the scope of the invention, which is defined by the following claims.

We claim:

1. A process for rejuvenating particulate used as catalysts after being removed from prior hydrocarbon processing operations, the process comprising:

(a) introducing particulate catalyst containing a hydrocarbon oil coating and contaminant metals compound deposits into a treatment vessel and providing a bed of said used catalyst within said treatment vessel, said treatment vessel having catalyst stirring means and means for passing solvent washing and acid treating liquids said treatment vessel to contact said catalyst;

(b) solvent washing said particulate used catalyst with a water-soluble solvent liquid while gently stirring said particulate used catalyst to enhance catalyst-liquid contact in said treatment vessel, and maintaining reaction conditions of solvent:catalyst weight ratio, temperature and contact time sufficient for substantially removing said hydrocarbon oil coating from said particulate used catalyst;

(c) draining said solvent liquid from said used catalyst bed so as to provide an essentially oil-free catalyst material in said treatment vessel;

(d) water washing said oil-free catalyst to substantially remove said solvent liquid and at least partially fill the pores of said used catalyst with water, (e) contacting said bed of substantially oil-free catalyst in said treatment vessel with a dilute acid solution at acid:catalyst weight ratio of 2:1–3:1, and dissolving and removing the contaminant metal compound deposits from said used catalyst while gently stirring said catalyst in said vessel, and removing minimal active metals not exceeding about 4 wt. % and minimal base material not exceeding about 6 wt. % from said used catalyst;

(f) water washing said acid-treated catalyst to substantially remove said dilute acid solution from said used catalyst;

(g) withdrawing said particulate rejuvenated catalyst from said treatment vessel; and wherein steps a–g are all performed using only liquid-solid contacting.

2. A catalyst rejuvenation process according to claim 1, wherein the solvent liquid is acetone, the solvent:catalyst weight ratio is in the range of 1.5:1–3:1, the catalyst temperature is 100–130° F. and the contact time duration is 60–120 minutes.

3. The catalyst rejuvenation process of claim 1, wherein the water washing of the substantially oil-free catalyst after the solvent washing step is performed in first and second successive steps.

4. A catalyst rejuvenation process according to claim 1, wherein the dilute acid solution is 10–20 wt % sulfuric acid solution, the acid:catalyst weight ratio is 2:1–3:1, and active metals removal does not exceed 3 wt. % and base material removal does not exceed 5 wt. % from the catalyst.

5. The catalyst rejuvenation process of claim 1, wherein the solvent liquid is recovered from the first water washing step by solvent/water distillation and the solvent is reused in the process.

6. The catalyst rejuvenation process of claim 1, wherein water washing of the catalyst after acid treatment is performed in two successive steps.

7. The catalyst rejuvenation process of claim 1, wherein the acid is recovered from the first treatment step by acid/water distillation and the acid is reused in the process.

8. The catalyst rejuvenation process of claim 1, wherein during the catalyst solvent washing and acid treatment steps the stirring means has rotary speed of 1–20 rpm and blade tip speed not exceeding about 2.6 ft/sec.

9. A catalyst rejuvenation process according to claim 1, wherein the particulate rejuvenated catalyst is 5,000–20,000 pound batch and the rejuvenated catalyst is withdrawn from the treatment vessel downwardly through a central lower conduit and control valve, and is passed to a catalyst oxidation step for substantial burn-off of carbon deposits from the catalyst.

10. A process for rejuvenating particulate used catalyst after being removed from a prior hydrocarbon processing operation by treating the catalyst in a single vessel, comprising the steps of:

(a) introducing a batch of particulate used catalyst material containing a heavy hydrocarbon oil coating and contaminant metals compound deposits into a treatment vessel, and providing a bed of said used catalyst within the vessel lower portion having catalyst stirring means provided therein;

(b) solvent washing the particulate used catalyst with acetone liquid solvent while gently stirring the catalyst bed to enhance catalyst/liquid contact in the vessel, and maintaining 1.5–3:1 weight ratio of acetone:catalyst at 100–130° F. temperature for 60–120 minute duration and substantially removing the heavy hydrocarbon oils coating from the catalyst particles;

(c) draining the liquid acetone solvent from the catalyst bed so as to provide an essentially oil-free catalyst material in the bed;

(d) water washing the substantially oil-free catalyst in two steps to substantially remove the solvent liquid and fill the catalyst pores with water;

(e) contacting the bed of substantially oil-free catalyst in said vessel with 10–20 wt. % sulfuric acid solution at acid:catalyst weight ratio of 2.5:1 and dissolving and removing the contaminant metal compound deposits from the catalyst in the vessel while removing active metals not exceeding about 3 wt. % and base material not exceeding about 5 wt. %;

(f) water washing the acid-treated catalyst in two steps to substantially remove the acid therefrom; and (g) withdrawing the particulate rejuvenated catalyst from the treatment vessel downwardly through a withdrawal conduit and control valve located in the vessel lower portion, passing the catalyst to an oxidation step and oxidizing substantially all carbon deposits from the catalyst to provide a rejuvenated particulate catalyst wherein steps a–g are all performed using only liquid-solid contacting.

* * * * *